United States Patent [19]

Stott

[11] 4,394,461
[45] Jul. 19, 1983

[54] AZOCARBOXYLATE BLOWING AGENT

[75] Inventor: Paul E. Stott, Houston, Tex.

[73] Assignee: Uniroyal, Inc., New York, N.Y.

[21] Appl. No.: 430,101

[22] Filed: Sep. 30, 1982

[51] Int. Cl.$^3$ .............................................. C08J 9/10
[52] U.S. Cl. .................................... 521/113; 521/93; 521/94; 521/124; 521/125; 521/138; 521/182
[58] Field of Search ................... 521/113, 93, 94, 124, 521/125, 138, 182

[56] References Cited

U.S. PATENT DOCUMENTS 3,095,387  6/1963  Kleinfeld .............................. 521/125
3,111,496  11/1963  Hunter ................................... 521/93
3,993,609  11/1976  Kamens et al. ....................... 521/95

Primary Examiner—Morton Foelak
Attorney, Agent, or Firm—Andrew D. Maslow

[57] ABSTRACT

A foamable polyester resin composition is provided and a method for making the same. The composition comprises (a) a liquid unsaturated polyester resin, (b) an azocarboxylate, (c) an organic peroxide or hydroperoxide, (d) a proton donor, (e) a metal promoter, (f) optionally a surfactant, and (g) optionally a filler.

10 Claims, No Drawings

AZOCARBOXYLATE BLOWING AGENT

FIELD OF THE INVENTION

This invention relates to an improved process for expanding and curing polyester resin and a new azocarboxylate blowing agent composition.

BACKGROUND OF INVENTION

There are many references to methods of preparing foamed polyester resin compositions, usually dealing with foaming and crosslinking as separate operations. Either a foam is prepared and then crosslinked without destroying it, or the resin is crosslinked while gas is being released into it. In either of the approaches the gas may be provided by a variety of means.

Azocarboxylates are very efficient blowing agents releasing about three times as much gas as for instance azodicarbonamide, the most widely used chemical blowing agent. No method has been known wherein azocarboxylates are employed as the sole blowing agents for the expansion of polyester resin, i.e., there is no commercially practical method to use such a system. This deficiency is overcome by the instant invention.

U.S. Pat. No. 3,095,387 June 25, 1963 discloses use of azodicarboxylate for the expansion of liquid polysulfide rubber.

U.S. Pat. No. 3,111,496 Nov. 19, 1963 teaches the use of azodicarboxylates for the expansion of organoplastic at a temperature of 148° C. or higher.

U.S. Pat. No. 3,993,609 Nov. 23, 1976 discloses the use of certain azo-compounds other than azodicarboxylates for the expansion of polyester resins.

Japanese Patent Application No. 79/166918 teaches the expansion of polyester foam using a combination of certain hydrazides with azodicarboxylic acid salts.

SUMMARY OF THE INVENTION

The invention provides a method and a composition used for expanding and curing polyester resin. To a liquid unsaturated polyester resin are added effective amounts of azocarboxylate, a hydrogen donor, a peroxide and a metal promotor. A surface active agent (surfactant) and/or a filler may be optionally included as well.

The invention provides a means for excellent control over a wide range of gel time. The proton donor concentration not only determines the rate of gas development but also the rate of cure. In practical terms this means that one of ordinary skill in the art can lengthen or shorten the time necessary for the polyester resin to set without either premature or overly delayed gas release by the blowing agent. This is an important benefit since in polyester resin expansion it is important that crosslinking and expansion occur essentially simultaneously. On the other hand, the gel time, and for that matter, blowing agent decomposition rate, can be controlled by the levels of metal promoter. The ultimate state of cure is, of course, dependent on the concentration of peroxide curative, and the amount of foam developed depends on the level of blowing agent present. It is surprising that the instant process can be carried out using very low levels of metal promoter. Also varying gel time or rate of cure can be achieved essentially without loss of quality of cell structure and cell uniformity in the ultimately foamed product.

Specifically this invention provides a foam and method for its preparation from liquid ethylenically unsaturated polyester resins by blending various ingredients as outlined below.

| | INGREDIENT | GENERAL | PRE-FERRED | MOST PRE-FERRED |
|---|---|---|---|---|
| (a) | Polyester resin, parts | 100 | 100 | 100 |
| (b) | Azocarboxylate, parts | 0.1–10 | 0.5–5 | 0.5–3 |
| (c) | Hydrogen peroxide or organic (hydro)peroxide (parts) | 0.1–4.0 | 0.5–3.0 | 1–2.5 |
| (d) | Proton donor, parts | 0.1–20 | 1–15 | 1–5 |
| (e) | Metal promoter, ppm* | 3–1000 | 4–500 | 4–350 |
| (f) | Surface active agent, parts | 0–2 | 0.5–1.5 | 0.75–1.25 |
| (g) | Filler | 0–250 | 0–150 | 0–100 |

*Based on metal

DESCRIPTION OF THE INVENTION

The liquid unsaturated polyester resins (a) in the composition may be a linear or only slightly branched polyester resin and an ethylenically unsaturated monomeric compound. The resin, per se, is typically prepared as a condensation or polyesterification reaction product of an unsaturated polybasic acid and a polyhydric compound; for example, the condensation product of an unsaturated dibasic acid of alpha-beta ethylenic unsaturation of a di- or trihydric compound, such as a glycol. Often a saturated polybasic acid or anhydride, such as a dibasic acid, is employed with the unsaturated acid or anhydride to modify the reactivity of the unsaturated resin.

Examples of aromatic and saturated polybasic acids include, but are not limited to: isophthalic acid; orthophthalic acid, terephthalic acid, tetrabromophthalic acid, tetrachlorophthalic acid, tetrahydrophthalic acid, adipic acid, succinic acid, azelaic acid, gluratic acid and the various anhydrides obtained therefrom. Unsaturated polybasic acids include, but are not limited to: maleic acid, fumaric acid, itaconic acid, citraconic acid and anhydrides obtained therefrom.

At times, unsaturated acid or anhydride substituted bridged ring polyenes are used to modify cure characteristics of the resins.

Typical polyhydric alcohols include, but are not limited to: ethylene glycol, 1,2-propanediol, 1,3-propane diol; diethylene glycol, dipropylene glycol, triethylene glycol, tripropylene glycol, 1,2-butanediol, 1,3-butanediol, 1,4-butanediol, neopentyl glycol, 2,2,5-trimethylpentanediol, cyclohexanedimethylol, dibromoneopentyl glycol, dibromobutanediol, trimethylolpropane, pentaerythritol, trimethylpentane-diol, dipropoxy adducts of bisphenol A, and dipropoxy adducts of hydrogenated bisphenol A.

Examples of ethylenically unsaturated monomers employed with the linear polyesters include, but are not limited to: styrene, vinyl toluene, acrylates and methacrylates like methyl methacrylate, alpha-methyl styrene, chlorostyrene, and diallyl phthalate. The ratio of the resin, per se, to unsaturated monomer may vary from 75/25 to 50/50 by weight. See, for example, U.S. Pat. Nos. 2,555,313, Ellis, Sept. 9, 1941, 2,667,430, Wells, Jan. 26, 1954; or 3,267,055, Amidon, Aug. 15, 1966, for further details of suitable polyester compositions comprising an unsaturated linear or slightly branched polyester and a copolymerizable ethylenic monomer which is a solvent for the polyester to provide a liquid composition capable of cross-linking to a solid state in the presence of a peroxide or hydroperoxide catalyst or polymerization initiator. Unless otherwise indicated, the expression "polyester" refers to the (poly) condensation product and the term "polyester resin" as used herein has reference to a composition comprising such condensation product and an ethylenically unsaturated monomer.

The liquid unsaturated polyester resins also typically contain small amounts of inhibitors in order to prevent premature reaction, such as hydroquinone, quinone and tertiary butyl catechol, as well as a wide variety of other additives such as: viscosity index improvers, rheological agents, flame retardants, thermoplastic polymers, pigments, dyes, stabilizers, glass fibers, release agents, extenders, alumina surfactants and other additives. Fillers may also be included in polyester resins such as hollow glass or plastic microsphere beads, wood flour, silica, diatamacieous earth, ground glass, etc. Filler levels may be as high as 70 percent by weight, usually no more than 60 percent.

The various components of the polyester resins may be varied as is known in the art to impart the desired properties to the cured resin. Flexible resins employ greater amounts of adipates or azeleates, while more rigid resins use phthalates, with a variety of different glycols.

Resin containing higher amounts of linear dibasic glycols and linear dibasic acids, e.g., over 70%, while maintaining a low amount of aromatic dihydric acids and anhydrides, unsaturated acids, and monomers, exhibit a higher degree of elasticity. Formulating for these properties becomes limited by the desired rigidity and heat resistance properties of the finished foam product.

The liquid unsaturated polyester resins are employed in conjunction with a free-radical curing compound or a compound capable of forming a free radical. The cross-linked initiating compound is usually an organic (hydro-)peroxide. Such peroxides are characterized by their reaction with metal salts or metal salts or metal soaps which are a general class of agents known as accelerators or promoters. Suitable peroxides include, but are not limited to hydrogen peroxide, saturated aliphatic hydroperoxides, olefinic hydroperoxides, aralkyl hydroperoxides, hydroperoxides of cycloaliphatic and heterocyclic organic molecules, dialkyl peroxides, transanular peroxides, peroxyesters, peroxy derivatives of aldehydes and ketones, hydroxyalkyl, hydroperoxides, bis(hydroalkyl) peroxides, polyalkylidenes peroxides, peroxy acetals, methyl hydroperoxide, ethyl hydroperoxide, t-butyl hydroperoxide, dimeric benzaldehyde peroxide, dimeric benzophenone peroxide, demeric acetone peroxide, methylethyl ketone hydroperoxide, etc.

It should be noted that all these organic (hydro-)peroxides are not available in commerce at 100 percent concentrations. Rather, some are used diluted in a suitable carrier such as an organic solvent. In Addition, the so-called active oxygen content of such commercial peroxides may vary depending on the type of peroxides as well as storage conditions and age. Nevertheless, the amounts of peroxide stated reflect the total peroxide compositions usually containing about 50% peroxide compound. Proper adjustment of peroxide concentrations in the polyester resins may have to be made when using peroxide compositions containing substantially lower levels of active peroxide (for further information see Jacyzyn et al, "Methyl ethyl ketone peroxides, relationship of reactivity to chemical structure," paper presented at 32nd Annual Technical Conference, 1977 Society of the Plastics Industry).

Preferred peroxides are alkoxy peroxides which are activated at relatively low or ambient temperature i.e., as low as 15° C., normally at about 20°–50° C. The most preferred peroxide is methyl ethyl ketone peroxide.

The azocarboxylates used in the invention can be defined by the formula

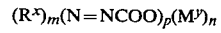

$$(R^x)_m(N{=}NCOO)_p(M^y)_n$$

wherein M is a metal; x is the valence of R and is 1–6, y is the valence of M and is 1–4, and mx=ny=p where p=1–24; and R is:

(1) A, a mono- or polyvalent radical;
$C_1$–$C_{10}$ alkyl, haloalkyl; $C_5$–$C_6$ cycloalkyl;
$C_7$–$C_9$ aralkyl;
$C_7$–$C_9$ alkaryl;
phenyl, halophenyl, phenylene; naphthyl;
$C_4$–$C_{10}$ oxydialkylene oxydiphenylene; or (2) $COOM^1$, where $M^1$ is the same or different from M, or (3) $COOR^1$ where $R^1$ is A; or (4) $COR^2$, where $R^2$ is A or $NH_2$.

It should be understood that the term "polyvalent" denotes radicals being di-, tri-, tetra, penta- or hexavalent.

The radicals in the above formula can be further defined as shown in Tables I & II below.

TABLE I

| Radical | | Broad | Preferred | Most Preferred |
|---|---|---|---|---|
| M,M$^1$ | | metal | Li,Na,K,Mg Ca,Sr,Ba,Ti Zr,V,Cr,Mn Zn,Cd | Na,K,Sr,Ba Cr,Fe,Co,Ca Zn,V |
| x, y | | 1–4 | 1–4 | 1–3 |
| m, n | | 1–6 | 1–4 | 1–2 |
| p | | 1–24 | 1–12 | 1–4 |
| R,R$^1$,R$^2$: | alkyl | $C_1$–$C_{10}$ | $C_1$–$C_4$ | $C_1$–$C_4$ |
| | haloalkyl | | | |
| | cycloalkyl | $C_5$–$C_6$ | $C_5$–$C_6$ | $C_6$ |
| | aralkyl | $C_7$–$C_9$ | $C_7$–$C_8$ | $C_7$–$C_8$ |
| | alkaryl | $C_7$–$C_9$ | $C_7$–$C_8$ | $C_7$ |
| | phenyl | yes | yes | yes |
| | halophenyl | | | |
| | naphthyl | yes | no | no |
| | oxydialkylene | $C_4$–$C_{10}$ | $C_4$–$C_6$ | $C_4$–$C_6$ |
| | NH$_2$ (R$^2$ only) | yes | yes | no |

TABLE II

| R | x | m | M | y | n | p |
|---|---|---|---|---|---|---|
| CH$_3$ | 1 | 1 | Li | 1 | 1 | 1 |
| C$_4$H$_9$ | 1 | 1 | Na | 1 | 1 | 1 |
| C$_6$H$_{13}$ | 1 | 1 | K | 1 | 1 | 1 |
| C$_{10}$H$_{21}$ | 1 | 1 | Li | 1 | 1 | 1 |
| CH$_2$ | 2 | 2 | Mg | 2 | 2 | 4 |
| CH$_2$CH$_2$ | 2 | 3 | Ba | 2 | 3 | 6 |
| CH(CH$_3$)$_2$ | 2 | 2 | Ti | 4 | 1 | 4 |
| (CH$_2$)$_4$ | 2 | 1 | Sr | 2 | 1 | 2 |
| (CH$_2$)$_6$ | 2 | 1 | Cd | 2 | 1 | 2 |
| (CH$_2$)$_{10}$ | 2 | 1 | Zn | 2 | 1 | 2 |
| cC$_5$H$_9$ | 1 | 3 | Ni | 3 | 1 | 3 |
| cC$_5$H$_8$ | 1 | 3 | Co | 3 | 1 | 3 |
| cC$_6$H$_{11}$ | 1 | 1 | Na | 1 | 1 | 1 |
| cC$_6$H$_{10}$ | 2 | 1 | Cu | 2 | 1 | 2 |
| CH$_2$Cl | 1 | 1 | K | 1 | 1 | 1 |
| CHClCH$_2$ | 2 | 1 | Na | 1 | 2 | 2 |

TABLE II-continued

| R | x | m | M | y | n | p |
|---|---|---|---|---|---|---|
| $CCl_3(CH_2)_5$ | 1 | 1 | Na | 1 | 1 | 1 |
| $aC_6H_5$ | 1 | 1 | K | 1 | 1 | 1 |
| $aC_6H_4$ | 2 | 1 | Ba | 2 | 1 | 2 |
| $aC_6H_3$ | 3 | 1 | Cr | 3 | 1 | 3 |
| $aC_{10}H_7$ | 1 | 1 | Na | 1 | 1 | 1 |
| $aC_{10}H_6$ | 2 | 1 | Na | 1 | 2 | 2 |
| $aC_6H_4I$ | 1 | 1 | Li | 1 | 1 | 1 |
| $aC_6H_3Cl_2$ | 1 | 2 | Ba | 2 | 1 | 2 |
| $(aC_6H_5)CH_2$ | 1 | 2 | Zn | 2 | 1 | 2 |
| $(aC_6H_4)CH_2$ | 2 | 1 | Sr | 2 | 1 | 2 |
| $(aC_6H_5)C(CH_3)_2$ | 1 | 1 | K | 1 | 1 | 1 |
| $CH_2CH_2OCH_2CH_2$ | 2 | 1 | K | 1 | 2 | 2 |
| $(CH_2)_5O(CH_2)_5$ | 2 | 2 | Ba | 2 | 2 | 4 |
| $aC_6H_4OaC_6H_4$ | 2 | 1 | Sr | 2 | 1 | 2 |
| COOLi | 1 | 4 | Ti | 4 | 1 | 4 |
| $(COO)_2Mg$ | 2 | 1 | Mn | 2 | 1 | 3 |
| $(COO)_2Sr$ | 2 | 1 | Sr | 2 | 1 | 2 |
| $(COO)_2Ba$ | 2 | 2 | Ba | 2 | 2 | 4 |
| $(COO)_4Ti$ | 4 | 1 | K | 1 | 4 | 4 |
| $(COO)_4Zr$ | 4 | 1 | Zr | 4 | 1 | 4 |
| $(COO)_4V$ | 4 | 2 | V | 4 | 2 | 8 |
| $(COO)_3Cr$ | 3 | 2 | Cr | 3 | 2 | 6 |
| $(COO)_2Mn$ | 2 | 2 | Mn | 2 | 2 | 4 |
| $(COO)_3Fe$ | 3 | 2 | Na | 1 | 6 | 6 |
| $(COO)_3Co$ | 3 | 1 | Co | 3 | 1 | 3 |
| $(COO)_3Ni$ | 3 | 1 | Ni | 3 | 1 | 3 |
| $(COO)_2Cu$ | 2 | 4 | Ba | 2 | 4 | 8 |
| $(COO)_2Zn$ | 2 | 3 | Zn | 2 | 3 | 6 |
| $(COO)_2Cd$ | 2 | 2 | Cd | 2 | 2 | 4 |
| $(COO)_2CH_2$ | 2 | 1 | Li | 1 | 2 | 2 |
| $(COO)_2C_4H_8$ | 2 | 1 | K | 1 | 2 | 2 |
| $(COO)_4C(CH_2)_4$ | 4 | 1 | K | 1 | 4 | 4 |
| $(COCH_2)_2CH_2$ | 2 | 1 | Ba | 2 | 1 | 2 |
| $COOaC_6H_5$ | 1 | 1 | Na | 1 | 1 | 1 |
| $(COO)_2aC_6H_4$ | 2 | 1 | Sr | 2 | 1 | 2 |
| $(COO)_3aC_6H_3$ | 3 | 1 | K | 1 | 3 | 3 |
| $(CO)_2CH_2$ | 2 | 2 | Ti | 4 | 1 | 4 |
| $(COCH_2)_4C$ | 4 | 1 | Zn | 2 | 2 | 4 |
| $(CO)_2C_6H_{12}$ | 2 | 1 | Cu | 2 | 1 | 2 |
| $COcC_5H_9$ | 1 | 1 | Li | 1 | 1 | 1 |
| $(CO)_2cC_6H_{10}$ | 2 | 1 | Na | 1 | 2 | 2 |
| $(CO)_2aC_{10}H_6$ | 2 | 1 | Ba | 2 | 1 | 2 |
| $(CO)_3aC_6H_3$ | 3 | 1 | Fe | 3 | 1 | 3 |
| $(COCH_2)_2aC_6H_4$ | 3 | 1 | Fe | 3 | 1 | 3 |
| $(COC_3H_7)_2O$ | 2 | 1 | Cd | 2 | 1 | 2 |
| $(COC_5H_{11})_2O$ | 2 | 1 | K | 1 | 2 | 2 |
| $CONH_2$ | 1 | 1 | Na | 1 | 1 | 1 |

Remarks:
a = aromatic
c = cyclo

The metal promoter (e) used in the invention may be inorganic, e.g. aqueous solution, of copper chloride, copper bromide, copper sulfate, copper orthophosphite, or organic acid salts of copper such as copper naphthenate, copper decanoate, copper 2-ethylhexanoate, copper octonoate, copper hexanoate.

Usually the copper promoter alone is sufficient; other metal promoters may be used, although they are less effective but may enhance the peroxide promoting action of such copper salts. Other organic metal salt promoters include those based on copper, vanadium, cobalt, cadmium, manganese, tin, lead, zirconium, chromium, lithium, calcium, nickel, iron and potassium, and organic acids outlined below. The organic anions of such salts may be derived from a variety of organic acids having from two to 20 carbon atoms and include acetic acid, 6 propionic acid, butyric acid, 2-ethylhexanoic acid, hexanoic acid, octoic acid, aluric acid, oleic acid, linoleic acid, palmitic acid, stearic acid, naphthenic acid; also complexes of such metals with acetoacetone.

The hydrogen donor of the invention may be water, $C_1-C_4$ organic acid such as formic acid, acetic acid, propionic acid, oxalic acid, maleic acid, acrylic acid.

Such acids are preferably added to the polyester resin in an ionizing medium such as water, $C_1-C_4$ alcohol or mixtures thereof.

Surfactants suitable for making polyester foam are well known to the art. Silicone alkylene glycol co- and block co-polymers are preferred, although others are applicable such as ethyoxylated alkyphenols and fluorohydrocarbons. Representative examples are nonylphenyl polyethylene glycol ether, nonylphenoxy poly(ethyleneoxy)ethanol, di-tridecyl sodium succinate, stearyl dimethylbenzylammonium chloride, block co-polymers of dimethylpolysiloxane with poly(ethyleneoxide or poly(propyleneoxide) and the like.

Although the effect of surface active agents is beneficial toward cell stabilization, they are not essential for carrying out the invention.

To prepare the polyester foam in accordance with the invention all of the ingredients may be added to the polyester resin except proton donor (d) and peroxide (c), the latter to be added last, i.e., their addition will cause the polyester to foam and cure more or less rapidly depending on concentration of key ingredients. It is preferred that the peroxide and proton donor are pre-blended. Also, the azocarboxylate may be charged to resin in the form of a paste going through a mixing head or resin transfer mixer. The peroxide/proton donor mixture is still added last. For spray applications, the peroxide, possibly in aqueous solution or dispersion, may be injected into the exit nozzle of the spray.

To illustrate the invention more fully, attention is directed to the following examples.

EXAMPLE 1

To 25 g polyester resin (1 mol maleic acid, 1 mol phthalic acid and 2 mol propylene glycol) in a 118 ml paper cup, was added copper naphthenate so that the Cu metal concentration in the resin was 240 ppm by weight. Sodium azodicarboxylate powder (0.5 g) was thoroughly blended into the resin. Then while agitating, the mixture, 0.5 g of methyl ethyl ketone peroxide (50% in dimethyl phthalate), was added as well as various amounts of proton donor ($H_2O$) as indicated in Table II below.

TABLE II

| Run No. | 1 | 2 | 3 | 4 |
|---|---|---|---|---|
| $H_2O$, g | 0 | 0.5 | 1.0 | 2.0 |
| Gel time, sec. | 2400 | 150 | 80 | 42 |
| FD[1], g/cm³ | no foam | 0.24 | 0.24 | 0.26 |
| DR[2], % | 0 | 78 | 78 | 76 |

Remarks:
[1] FD = foam density.
[2] DR = density reduction.

The results of Example 1 indicate that reduction in gel time is readily controlled resulting in foams having essentially the same foam density indicating that the level of porton donor determines rate of cure as well as rate of gas evolution.

EXAMPLE 2

Following essentially the procedure of Example 1, the following recipe was used:

| Polyester resin | 25 g | 100 | part(s) |
|---|---|---|---|
| Sodium azodicarboxylate | 0.25 g | 1 | part(s) |
| Water | 1.0 g | 4 | part(s) |
| MEK peroxide* (50%) | 0.5 g | 2 | part(s) |

-continued

| | | |
|---|---|---|
| Silicon glycol surfactant | 0.25 g | 1 part(s) |

*MEK peroxide = methyl ethyl ketone peroxide

Also added was copper naphthenate at various levels. The concentrations of copper as well as results of these experiments are described in Table III.

TABLE III

| Run No. | 5 | 6 | 7 | 8 | 9 |
|---|---|---|---|---|---|
| Cu, ppm | 2.4 | 8 | 24 | 80 | 160 |
| gel time (minutes) | 20+ | 9 | 3.2 | 3.3 | 2.3 |
| FD, g/cm$^3$ | * | | 0.32 | 0.29 | 0.29 | 0.32 |
| DR, % | 0 | | 71 | 74 | 74 | 71 |

*Foam collapsed before onset of gel.

The results of Example 2 indicate that only low concentrations of the metal promoter are required, and that the increasing levels of promoter cause increased rate of cure without essentially affecting the product density.

EXAMPLE 3

Several other well known metal promoters were investigated within the context of this invention in accordance with the procedure of Example 1. The basic recipe was as follows:

| | | |
|---|---|---|
| Polyester resin | 25 g | 100 part(s) |
| Sodium azodicarboxylate | 0.25 g | 1 part(s) |
| MEK peroxide (50%) | 0.5 g | 2 part(s) |
| Silicon glycol surfactant | 0.25 g | 1 part(s) |
| Proton donor (water) | 1.0 g | 4 part(s) |
| Metal promoter | See Table IV | |

TABLE IV

| Run No. | 10 | 11 | 12 | 13 | 14 | 15 | 16 | 17 | 18 |
|---|---|---|---|---|---|---|---|---|---|
| Cu naphthenate, ppm* | 2.0 | 2.4 | — | — | 2.0 | 2.4 | 160 | — | 160 |
| Co naphthenate, ppm* | — | — | 2.0 | 160 | 2.0 | 160 | — | — | — |
| V naphthenate, ppm* | — | — | — | — | — | — | 60 | — | — |
| Fe naphthenate, ppm* | — | — | — | — | — | — | — | 120 | 120 |
| gel time, minutes | 30+ | 30+ | 30+ | 30 | 14 | 1.2 | 1.5 | 10 | 0.8 |
| FD, g/cm$^3$ | — | — | — | 0.42 | 0.19 | 0.16 | 0.22 | 0.37 | 0.26 |
| DR, % | 0 | 0 | 0 | 63 | 83 | 85 | 80 | 66 | 76 |

*Based on metal concentration on resin.

The results of Example 3 clearly indicate that copper promoter is more effective than the other metal promoters alone, although a combination of copper and other metal promoters (e.g., Co, V, Fe, Ni, Cr, Sn and Mn) may be successfully employed at relatively low concentrations. Non-copper type promoters can be employed at more conventional higher concentrations.

EXAMPLE 4

The usefulness of various azocarboxylates was investigated employing the following recipe (the procedure of Example 1 was essentially adopted):

| | | |
|---|---|---|
| Polyester resin | 25 g | 100 part(s) |
| MEK peroxide | 0.5 g | 2 part(s) |
| Cu naphthenate (based on metal) | 0.004 g | 160 ppm |
| Silicon glycol surfactant | 0.25 g | 1 part(s) |
| Azocarboxylate | 0.25 g | 1 part(s) |
| Water | 1.0 g | 4 part(s) |

For details on azocarboxylates used and resultant foam characteristics, see Table V.

TABLE V

| Run No. | Blowing Agent | Gel Time Minutes | FD$_3$ g/cm | DR % |
|---|---|---|---|---|
| 18 | DSAC$^{(1)}$ | 2.3 | 0.32 | 71 |
| 19 | DKAC$^{(2)}$** | 7.7 | 0.43 | 61 |
| 20 | BAAC$^{(3)}$* | 20 | 0.37 | 67 |
| 21 | STAC$^{(4)}$ | 5.2 | 0.62 | 43 |
| 22 | SBAC$^{(5)}$ | 0.1 | 0.45 | 59 |
| 23 | SPAC$^{(6)}$ | 0.3 | 0.32 | 71 |
| 24 | SAAC$^{(7)}$* | 0.5 | 0.35 | 68 |
| 25 | DSAC*** | 17 | 0.43 | 61 |
| 26 | STAC* | 2.5 | 0.40 | 64 |

Remarks:
$^{(1)}$DSAC: disodium azodicarboxylate
$^{(2)}$DKAL: dipotassium azodicarboxylate
$^{(3)}$BAAC: barium azodicarboxylate
$^{(4)}$STAC: strontium azodicarboxylate
$^{(5)}$SBAC: sodium t-butylazocarboxylate
$^{(6)}$SPAC: sodium phenylazocarboxylate
$^{(7)}$SAAC: sodium carboxamidoazocarboxylate
*1.5 g of 33% acetic acid in water used instead of 4 g of water.
**Copper sulfate (0.007 g of Cu$_2$SO$_4$ in 4 ml of H$_2$O) added instead of copper naphthenate.
***1.0 g acetic acid used as proton donor instead of water.

The results of Example 4 clearly indicate that azocarboxylates as contemplated by this invention cause efficient expansion when using the proton donors and metal promotors of this invention.

What is claimed is:

1. A foamable and curable polyester composition consisting essentially of, all parts by weight (unless otherwise indicated):

(a) 100 parts liquid unsaturated polyester resin;
   (b) 0.1–10 parts azocarboxylate of the formula $(R^x)_m(N=NCOO)_p(M^y)_n$ 

wherein M is a metal; x is the valence of R and is 1–6, y is the valence of M and is 1–4, and mx=ny=p where p=1–24; and R is:
   (1) A, a mono- or polyvalent radical: C$_1$–C$_{10}$ alkyl, haloalkyl; C$_5$–C$_6$ cycloalkyl; C$_7$–C$_9$ aralkyl; C$_7$–C$_9$ alkaryl; phenyl, halophenyl; naphthyl; C$_4$–C$_{10}$ oxydialkylene oxydiphenylene; or
   (2) COOM$^1$, where M$^1$ is the same as or different from M, or
   (3) COOR$^1$ where R$^1$ is A; or
   (4) COR$^2$, where R$^2$ is A or NH$_2$
   (c) 0.1–4.0 parts hydrogen peroxide, organic peroxide or organic hydroperoxide,
   (d) 0.1–20 parts proton donor
   (e) 3–1000 ppm, based on metal, of metal promoter,
   (f) 0–2.0 parts surface active agent, and
   (g) 0–250 parts filler.

2. The composition of claim 1 wherein the concentration of (b) is 0.5–5 parts, that of (c) is 0.5–3.0 parts, that of (d) is 1–15 parts, that of (e) is 4–500 ppm, that of (f) is 0.5–1.5 parts and that of (f) is 0–150 parts.

3. The composition of claim 1 wherein the concentration of (b) is 0.5–3 parts, that of (c) is 1–2.5 parts, that of (d) is 1.0–5.0 parts, that of (e) is 4–350 ppm, that of (f) is 0.75–1.25 parts and that of (g) is 0–100 parts.

4. The composition of claim 1 wherein (b) is selected from the group consisting of disodium azodicarboxylate, dipotassium azodicarboxylate, barium azodicarboxylate, strontium azodicarboxylate, sodium t-butylazocarboxylate, sodium phenylazocarboxylate, sodium carboxamidoazocarboxylate and sodium azocarboxylate.

5. The composition of claim 1 wherein (c) is methyl ethyl ketone peroxide.

6. The composition of claim 1 wherein (d) is water.

7. The composition of claim 1 wherein (e) is an organic salt of copper.

8. The composition of claim (1) wherein (b) is sodium azocarboxylate, (c) is methyl ethyl ketone peroxide, (d) is water and (e) is an organic salt of copper.

9. A method for preparing a foamed and cured polyester resin composition of claim 1 and comprising the steps of:
 (I) preparing a blend (a), (b), (e), (f) and (g) of claim 1,
 (II) adding (d) and (c) of claim 1 to product one step (I), and
 (III) exposing the mixture to foaming and curing conditions.

10. A method of claim 9 wherein (d) and (c) are preblended and (b) is charged into (a) in the form of a paste.

* * * * *

UNITED STATES PATENT AND TRADEMARK OFFICE
CERTIFICATE OF CORRECTION

PATENT NO. : 4394461
DATED : July 19, 1983
INVENTOR(S) : PAUL E. STOTT

It is certified that error appears in the above-identified patent and that said Letters Patent are hereby corrected as shown below:

In claim 9, line 6, delete "one" and insert therefor --of--.

Signed and Sealed this

Twenty-seventh Day of March 1984

[SEAL]

Attest:

GERALD J. MOSSINGHOFF

*Attesting Officer*  *Commissioner of Patents and Trademarks*